United States Patent
Chopra et al.

(10) Patent No.: US 7,410,750 B2
(45) Date of Patent: Aug. 12, 2008

(54) MULTICOLORED PHOTOCHROMIC DISPLAY

(75) Inventors: Naveen Chopra, Oakville (CA); Daniel A. Foucher, Toronto (CA); Raj D. Patel, Oakville (CA)

(73) Assignee: Xerox Corporation, Norwalk, CT (US)

( * ) Notice: Subject to any disclaimer, the term of this patent is extended or adjusted under 35 U.S.C. 154(b) by 709 days.

(21) Appl. No.: 10/881,682

(22) Filed: Jun. 30, 2004

(65) Prior Publication Data

US 2006/0001944 A1    Jan. 5, 2006

(51) Int. Cl.
    *G03C 1/00* (2006.01)
(52) U.S. Cl. .................. 430/345; 430/19; 430/333
(58) Field of Classification Search .......... None
    See application file for complete search history.

(56) References Cited

U.S. PATENT DOCUMENTS

| | | |
|---|---|---|
| 3,944,493 A | 3/1976 | Jadwin et al. |
| 4,007,293 A | 2/1977 | Mincer et al. |
| 4,079,014 A | 3/1978 | Burness et al. |
| 4,394,430 A | 7/1983 | Jadwin et al. |
| 4,560,635 A | 12/1985 | Hoffend et al. |
| 4,655,004 A | 4/1987 | Caillet |
| 4,692,603 A | 9/1987 | Brass et al. |
| 4,728,783 A | 3/1988 | Brass et al. |
| 4,728,984 A | 3/1988 | Daniele |
| 4,754,127 A | 6/1988 | Brass et al. |
| 4,782,221 A | 11/1988 | Brass et al. |
| 4,788,123 A | 11/1988 | Berkes et al. |
| 4,828,956 A | 5/1989 | Creatura et al. |
| 4,894,308 A | 1/1990 | Mahabadi et al. |
| 4,948,686 A | 8/1990 | Koch et al. |
| 4,963,455 A | 10/1990 | Laing et al. |
| 4,965,158 A | 10/1990 | Gruber et al. |
| 5,051,779 A | 9/1991 | Hikawa |
| 5,091,966 A | 2/1992 | Bloomberg et al. |
| 5,128,525 A | 7/1992 | Stearns et al. |
| 5,168,147 A | 12/1992 | Bloomberg |
| 5,291,243 A | 3/1994 | Heckman et al. |
| 5,337,361 A | 8/1994 | Wang et al. |
| 5,551,973 A | 9/1996 | Oliver et al. |
| 5,593,486 A | 1/1997 | Oliver et al. |
| 5,633,109 A | 5/1997 | Jennings et al. |
| 5,710,420 A | 1/1998 | Martin et al. |
| 5,759,729 A | 6/1998 | Martin et al. |
| 6,358,655 B1 | 3/2002 | Foucher et al. |
| 6,365,312 B1 | 4/2002 | Foucher et al. |
| 6,458,165 B1 | 10/2002 | Foucher et al. |
| 6,517,618 B2 | 2/2003 | Foucher et al. |
| 6,549,327 B2 | 4/2003 | Foucher et al. |
| 6,652,959 B2 | 11/2003 | Foucher et al. |
| 2002/0187414 A1 * | 12/2002 | Foucher et al. ......... 430/108.21 |

FOREIGN PATENT DOCUMENTS

| | | | |
|---|---|---|---|
| EP | 0 459 792 A2 | | 12/1991 |
| EP | 0 469 864 A2 | | 2/1992 |
| JP | 5-271649 A | * | 10/1993 |
| JP | 9-031453 A | * | 2/1997 |
| JP | 9-311355 A | * | 12/1997 |

* cited by examiner

*Primary Examiner*—John A. McPherson
(74) *Attorney, Agent, or Firm*—Eugene O. Palazzo; Fay Sharpe LLP

(57) ABSTRACT

A multicolored display and process for forming such a display is provided. The multicolored display includes marking particles comprising a mixture of photochromic materials. The photochromic materials each exhibit a first "invisible" photochromic state at a first absorption spectrum and at least a second "visible" photochromic state at a second absorption spectrum. The second "visible" photochromic state of each photochromic material produces a different color relative to the other photochromic materials. In embodiments, the marking particles include a mixture of a spiropyran material and a dithienylethene material.

30 Claims, No Drawings

MULTICOLORED PHOTOCHROMIC DISPLAY

BACKGROUND

The present disclosure relates to a multicolored display. More specifically, the exemplary embodiments of the present disclosure relate to a multicolored display having photochromic characteristics. In particular, the present exemplary embodiments are directed to marking particles comprising a mixture, i.e., a plurality of photochromic materials. Additionally, the present exemplary embodiments relate to a process for forming a multicolored display employing such marking particles. The exemplary embodiments are suitable for use in the display technology and are particularly suited for embedded display or marking technology.

Generally, photochromism is a reversible change of a single chemical species between two states having distinguishably different absorption spectra, wherein the change is induced in at least one direction by the action of electromagnetic radiation. The inducing radiation, as well as the changes in the absorption spectra, is usually in the ultraviolet, visible, or infrared regions. In some instances, the change in one direction is thermally induced. The single chemical species can be a molecule or an ion, and the reversible change in states may be a conversion between two molecules or ions, or the dissociation of a single molecule or ion into two or more species, with the reverse change being a recombination of the two or more species thus formed into the original molecule or ion.

Photochromic phenomena are observed in both organic compounds, such as anils, disulfoxides, hydrazones, oxazones, semicarbazones, stilbene derivatives, o-nitrobenzyl derivatives, spiro compounds, and the like, and in inorganic compounds, such as metal oxides, alkaline earth metal sulfides, titanates, mercury compounds, copper compounds, minerals, transition metal compounds such as carbonyls, and the like.

Photochromic materials are known in applications such as photochromic glasses, which are useful as, for example, ophthalmic lenses. It is also known to use a photochromic material in the printing or marking technologies. The use of a photochromic material in printing allows for the creation of unnoticeable, embedded or hidden images such as logos, text, watermarks, codes, etc. Hidden or embedded images may be desirable for authentication of the document, encryption, or the like. The use of a photochromic material to create an image allows the image to be hidden until exposed to a wavelength of light at which the photochromic material will absorb and undergo the photochromic process.

U.S. Pat. No. 5,633,109 (Jennings, et al.), the disclosure of which is totally incorporated herein by reference, discloses an ink composition which comprises an aqueous liquid vehicle, a photochromic material, and a vesicle-forming lipid, wherein vesicles of the lipid are present in the ink.

U.S. Pat. No. 5,593,486 (Oliver, et al.), the disclosure of which is totally incorporated herein by reference, discloses a hot melt ink composition comprising (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material, (c) an optional colorant, and (d) an optional propellant.

U.S. Pat. No. 5,551,973 (Oliver, et al.), the disclosure of which is totally incorporated herein by reference, discloses an ink composition which comprises an aqueous phase, an oil phase, a photochromic material, and a surfactant, said ink exhibiting a liquid crystalline gel phase at a first temperature and a liquid microemulsion phase at a second temperature higher than the first temperature.

U.S. Pat. No. 5,759,729 (Martin, et al.), the disclosure of which is totally incorporated herein by reference, discloses a toner composition for the development of electrostatic latent images which comprises particles comprising a mixture of a resin and a photochromic material. U.S. Pat. No. 5,759,729 also discloses a liquid developer composition for the development of electrostatic latent images which comprises a nonaqueous liquid vehicle and a photochromic material, wherein the liquid developer has a resistivity of from about $10^8$ to about $10^{11}$ ohm-cm and a viscosity of from about 25 to about 500 centipoise. U.S. Pat. No. 5,759,729 further discloses a liquid developer composition for the development of electrostatic latent images which comprises a nonaqueous liquid vehicle, a charge control agent, and toner particles comprising a mixture of a resin and a photochromic material.

U.S. Pat. No. 5,710,420 (Martin, et al.), the disclosure of which is totally incorporated herein by reference, discloses a method of embedding and recovering machine readable information on a substrate which comprises (a) writing data in a predetermined machine readable code format on the substrate with a photochromic marking material having a first state corresponding to a second absorption spectrum; and (b) thereafter effecting a photochromic change in at least some of the photochromic marking material from the first state to the second state.

James T. C. Wojtyk, Peter M. Kazmaier, and Erwin Buncel, "Effects of Metal Ion Complexation on the Spiropyran-Merocyanine Interconversion: Development of a Thermally Stable Photo-Switch," Chem. Commun. 1998, p. 1703, the disclosure of which is totally incorporated herein by reference, discloses spectrophotometric absorption and fluorescence measurements of spiropyrans

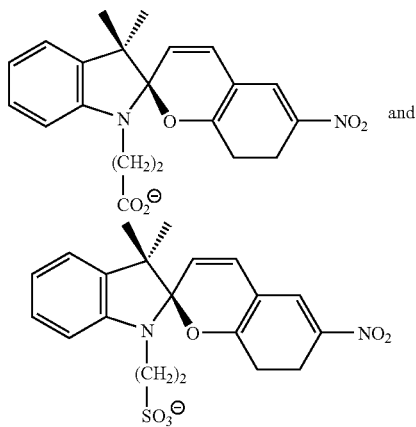

modified with chelating functionalities, in the presence of $Ca^{2+}$ and $Zn^{2+}$, that provide evidence of a thermally stable spiropyran-merocyanine photoswitch that is modulated by the metal cations.

U.S. Pat. No. 6,358,655 B1, entitled "Marking Particles," with the named inventors Daniel A. Foucher, Raj D. Patel, Naveen Chopra, and Peter M. Kazmaier, the disclosure of which is totally incorporated herein by reference, discloses marking particles comprising a resin, a chelating agent, and a spiropyran material which is of the formula

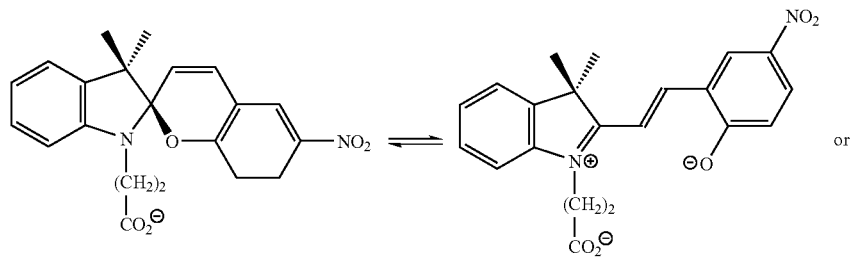

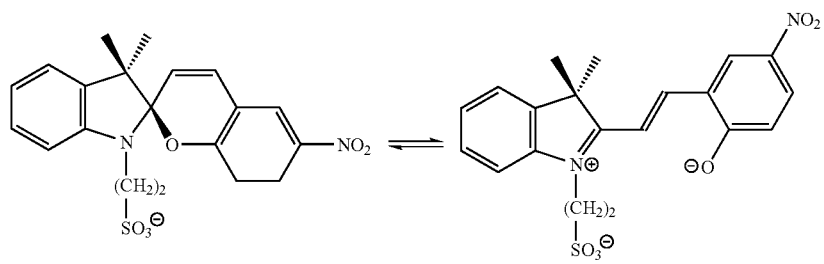

wherein n is an integer representing the number of repeat —CH$_2$— units and R is —H or —CH=CH$_2$. The marking particles are prepared by an emulsion aggregation process.

U.S. Pat. No. 6,365,312 B1 entitled "Marking Particles," with the named inventors Daniel A. Foucher, Raj D. Patel, Naveen Chopra, Peter M. Kazmaier, Erwin Buncel, and James Wojtyk, the disclosure of which is totally incorporated herein by reference, discloses marking particles comprising a first polymer, a second polymer, a chelating agent, and a spiropyran material of the formula which is dispersed the chelating agent and the spiropyran and encapsulated within a shell of the second polymer formulated by an interfacial polymerization.

U.S. Pat. No. 6,458,165 B1 entitled "Marking Particles," with the named inventors Daniel A. Foucher, Raj D. Patel, Naveen Chopra, Peter M. Kazmaier, Erwin Buncel, and James Wojtyk, the disclosure of which is totally incorporated herein by reference, discloses an addressable display comprising a substrate having uniformly situated thereon a coat-

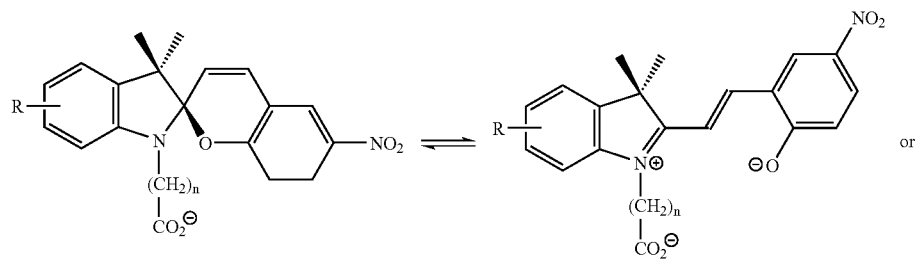

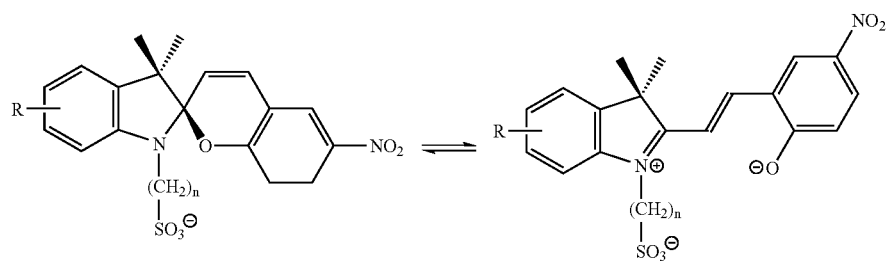

wherein n is an integer representing the number of repeat —CH$_2$— units and R is —H or —CH=CH$_2$. The marking particles comprise a core containing the first polymer in ing of marking particles comprising a first polymer, a second polymer, a chelating agent, and a spiropyran material of the formula

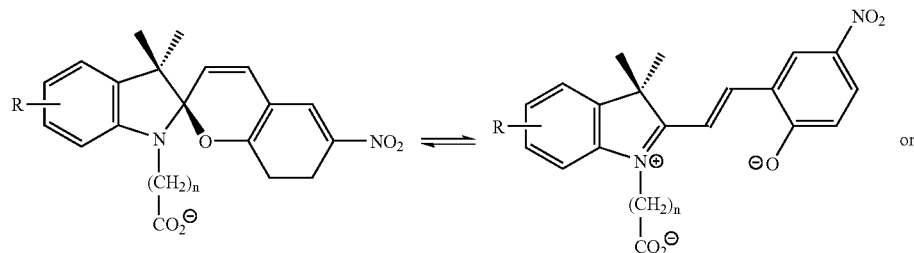

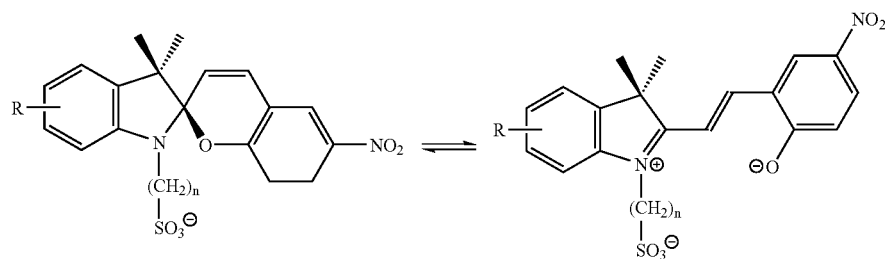

wherein n is an integer representing the number of repeat —CH$_2$— units and R is —H or —CH═CH$_2$. The marking particles comprise a core containing the first polymer in which is dispersed the chelating agent and the spiropyran and encapsulated within a shell of the second polymer formulated by an interfacial polymerization.

U.S. Pat. No. 6,652,959 B2, entitled "Marking Particles," with the named inventors Daniel A. Foucher, Raj D. Patel, Naveen Chopra, and Peter M. Kazmaier, the disclosure of which is totally incorporated herein by reference, discloses an addressable display comprising a substrate having uniformly situated thereon a coating of marking particles comprising a resin, a chelating agent, and a spiropyran material which is of the formula

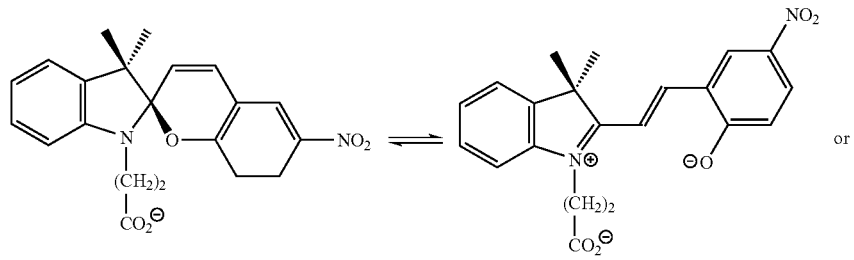

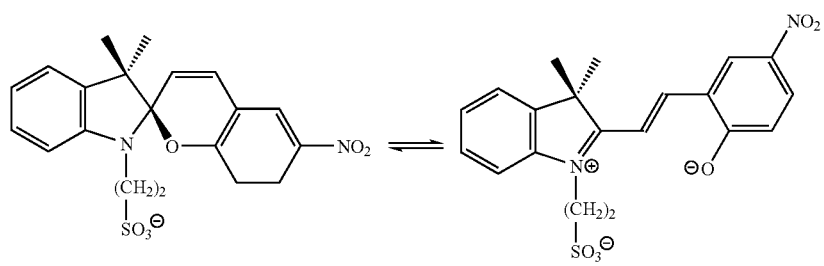

wherein n is an integer representing the number of repeat —CH$_2$— units and R is —H or —CH═CH$_2$. The marking particles are prepared by an emulsion aggregation process.

U.S. Pat. No. 6,517,618 B2 entitled "Photochromic Electrophoretic Ink Display," with the named inventors Daniel A. Foucher, Raj D. Patel, Naveen Chopra, Peter M. Kazmaier, Erwin Buncel, and James Wojtyk, the disclosure of which is totally incorporated herein by reference, discloses an electrophoretic ink comprising a suspending fluid and, suspended in the suspending fluid, a plurality of particles comprising a mixture of a chelating agent and a spiropyran material of the formula

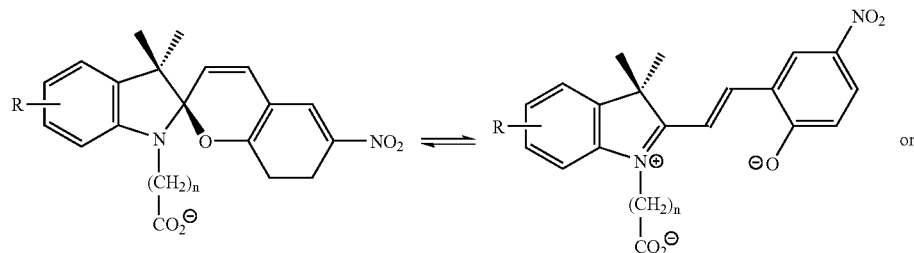

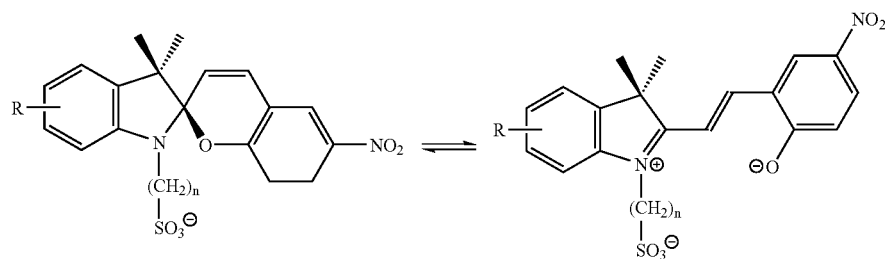

wherein n is an integer representing the number of repeat —$CH_2$— units and R is —H or —$CH=CH_2$, said particles being free to migrate within said suspending fluid under the influence of an electric field.

U.S. Pat. No. 6,549,327 B2 entitled "Photochromic Gyricon Display," with the named inventors Daniel A. Foucher, Raj D. Patel, Naveen Chopra, Peter M. Kazmaier, Erwin Buncel, and James Wojtyk, the disclosure of which is totally incorporated herein by reference, discloses a display comprising an arrangement of a plurality of optically anisotropic rotatable elements, each of said rotatable elements having a surface in contact with an enabling fluid, said rotatable elements being electrically dipolar in the presence of the enabling fluid and thus being subject to rotation upon application of an electric field, said rotatable elements being free to rotate in place but not free to translate substantially so as to disrupt the arrangement of rotatable elements, wherein a first portion of said surface contains a mixture of a chelating agent and a spiropyran material of the formula

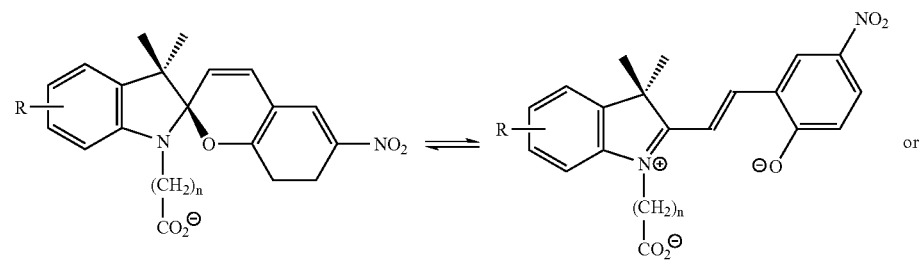

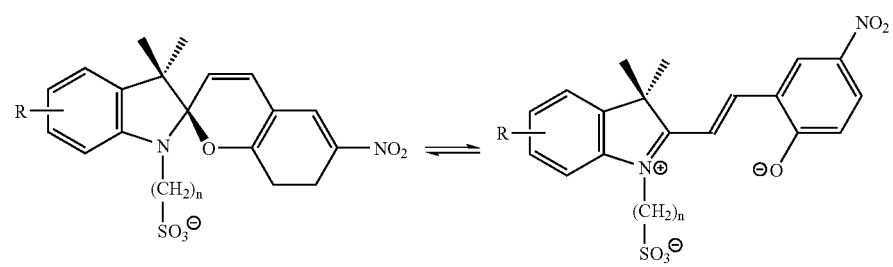

wherein n is an integer representing the number of repeat —CH$_2$— units and R is —H or —CH=CH$_2$, and wherein a second portion of said surface contains substantially no spiropyran.

In "Combinatorial Color Generation with Mixtures of Dithienyl Photochromes," Adv. Mater. 1999, vol 11, p. 910-913, the disclosure of which is totally incorporated herein by reference, Alvaro Fernandez-Acebes and Jean-Marie Lehn discloses the generation of multi-colored images created by UV irradiation of dithienylethenes of the structure

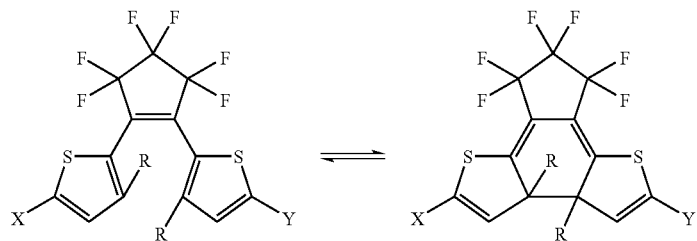

where
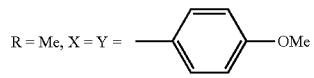
or
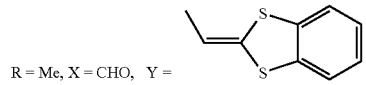
or
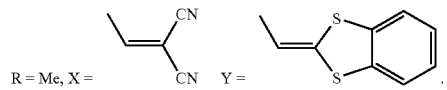
or

R = Me, X =

While known compositions and processes are suitable for their intended purposes, a need remains for improved display characteristics. In addition, a need remains for displays comprised of marking particles with multicolored photochromic characteristics. Further, a need remains for processes for preparing documents with images having multicolored photochromic characteristics. Additionally, a need remains for processes and materials that enable the placement of encoded information on documents which is not detectable to the reader but which is machine readable. There is also a need for displays comprised of multicolored photochromic marking particles that are thermally stable. In addition, there is a need for displays using multicolored photochromic marking particles wherein both resonance forms of the photochromic material are stable. Further, there is a need for displays made of multicolored photochromic marking particles wherein the two resonance forms of the photochromic material are addressable at different wavelengths. Additionally, there is a need for displays made of multicolored photochromic marking particles wherein both resonance forms of the photochromic material are stable for reasonable periods of time without the need for constant irradiation to maintain the resonance form. A need also remains for materials and processes that generate images that cannot be easily or accurately photocopied or scanned.

BRIEF DESCRIPTION

The exemplary embodiments of the present disclosure achieve one or more of the foregoing objects and provide, in one aspect, multicolored marking particles comprising a mixture of photochromic materials. The photochromic materials produce a different color, relative to each other, when exposed to particular wavelengths of light.

In another aspect, the present disclosure provides an addressable display formed from coating a substrate with marking particles. The marking particles comprise a mixture of photochromic materials that produce different colors when exposed to different wavelengths of light.

In a further aspect, the present disclosure provides an addressable display. The addressable display comprises a substrate having situated thereon a coating of marking particles comprising a mixture of photochromic materials including a spiropyran of the formula

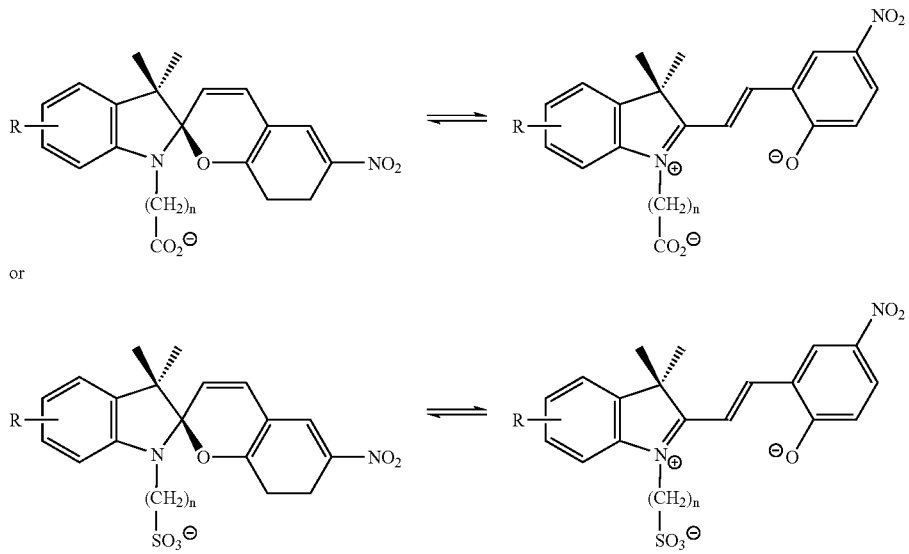

wherein n is an integer representing the number of repeat —$CH_2$— units and R is —H or —CH=$CH_2$, and a dithenylethene of the structure

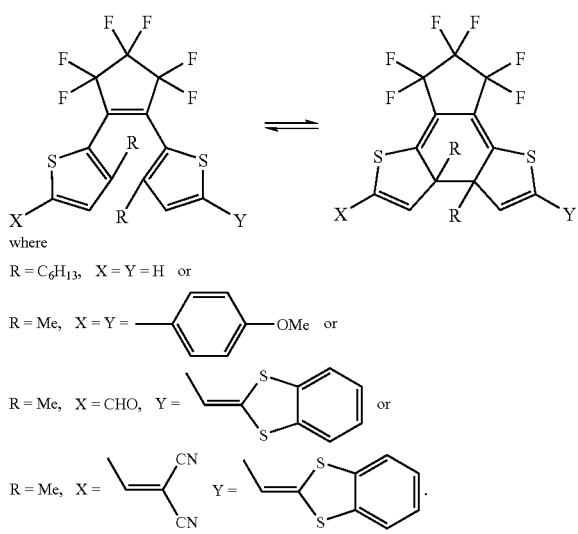

In still another embodiment, the present disclosure relates to an addressable display comprising a substrate having situated thereon a coating of marking particles comprising a mixture of spiropyran materials, each spiropyran being sensitive to a different wavelength of light and producing a different color relative to the other spiropyrans.

In still further embodiments, the marking particles may comprise a resin, a chelating agent dispersed in a mixture of the photochromic materials, or a core containing a first polymer, a second polymer, a chelating agent, and a mixture of photochromic materials wherein a core containing the chelating agent and mixture of photochromic materials is dispersed in the first polymer and encapsulated within a shell of the second polymer formulated by an interfacial polymerization. Alternatively, the marking particles may be prepared by an emulsion-aggregation process.

In another aspect, the present disclosure concerns a process which comprises (a) generating an electrostatic latent image on an imaging member; (b) developing the latent image by contacting the imaging member with marking particles having a mixture of photochromic materials wherein the photochromic materials are sensitive to different wavelengths of light and produce different colors relative to each other, and (c) thereafter effecting a photochromic change in at least one of the photochromic materials in the developed image.

These and other non-limiting aspects and/or objects of the exemplary embodiments of the present disclosure are more particularly disclosed below.

DETAILED DESCRIPTION

The marking particles of the present disclosure include a mixture of photochromic materials. Preferably the marking particles include two or more photochromic materials that, when subjected to the appropriate wavelength of light, undergo a photochromic change and produce a different color relative to the other photochromic materials.

In one embodiment, the marking particles comprise a mixture of two or more spiropyran materials where each spiropyran is sensitive to a different wave length of light. The spiropyrans produce a different color relative to one another when exposed to the appropriate wavelength of light such that a multicolored image may be formed.

Additionally, the marking particles of the present exemplary embodiment may comprise a mixture photochromic materials where at least one of the photochromic materials produces different colors when exposed to different wavelengths. That is, at least one of the photochromic materials exhibits a first visible photochromic state corresponding to a first absorption spectrum, and at least a second visible photochromic state corresponding to a second absorption spectrums. Different colors are produced at the first and second absorption spectrum. Preferably, the photochromic material capable of multiple photochromic shifts exhibit colors different than the other photochromic materials in the mixture. Suitable photochromic materials capable of multiple visible photochromic shifts include but are not limited to dithienylethenes and those compounds disclosed in U.S. Pat. No. 5,710,420, the entire disclosure of which is incorporated herein by reference.

In another embodiment, the marking particle comprises a mixture of photochromic materials, wherein one of the photochromic materials is capable of exhibiting multiple photochromic shifts. In this embodiment, the marking particle includes a spiropyran of the formula

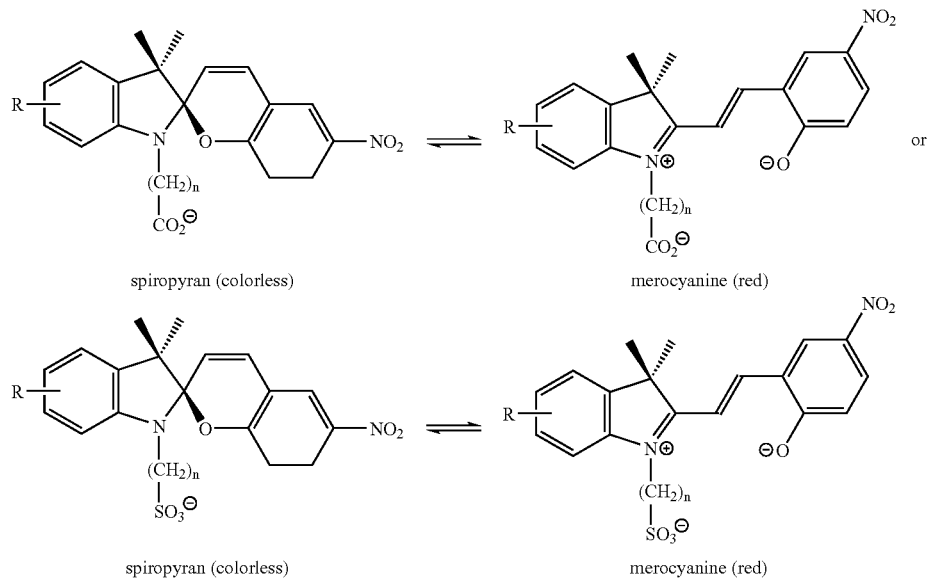

wherein n is an integer representing the number of repeat —CH$_2$— units, typically being from about 2 to about 8, although the value of n can be outside of this range, R is —H or —CH=CH$_2$, and the anionic —COO$^-$ and —SO$_3^-$ groups are accompanied by any desired or suitable cations; and a dithienyl material of the formula:

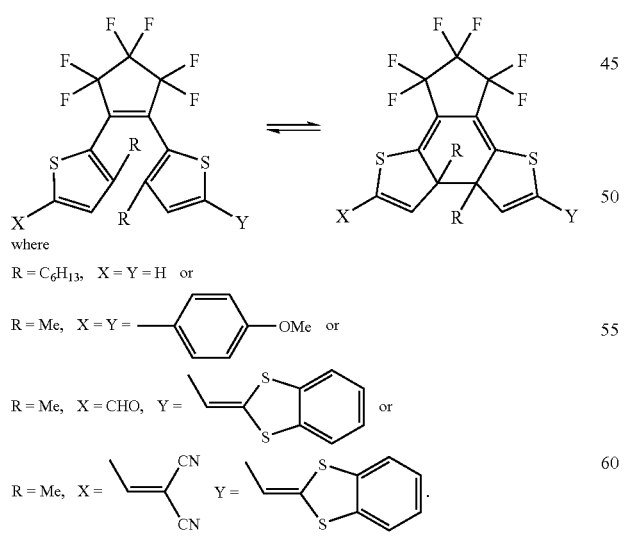

where
R = C$_6$H$_{13}$, X = Y = H or

R = Me, X = Y = ―⟨benzene⟩―OMe or

R = Me, X = CHO, Y = ⟨dithiolylidene⟩ or

R = Me, X = ⟨C(CN)$_2$⟩, Y = ⟨dithiolylidene⟩.

The spiropyran is not limited to any particular spiropyran. In embodiments, the spiropyran may be a spiropyran material of the formula

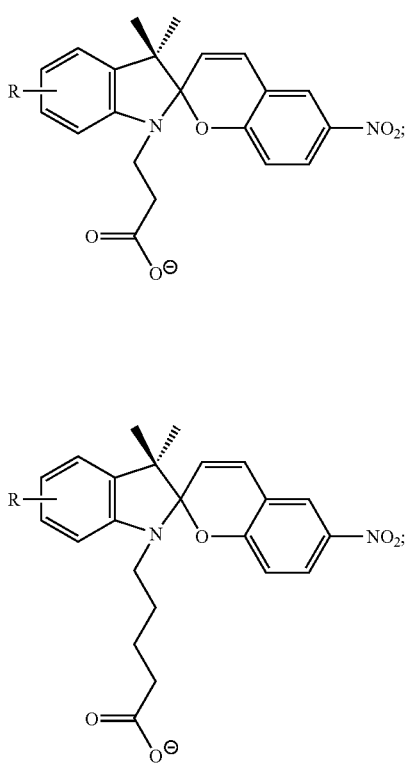

-continued

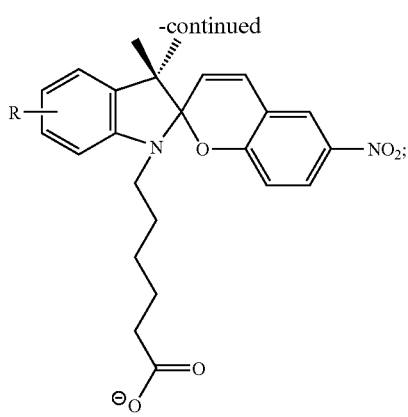

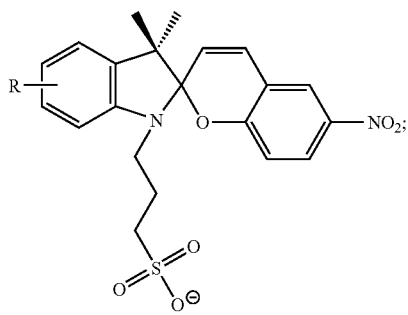

or

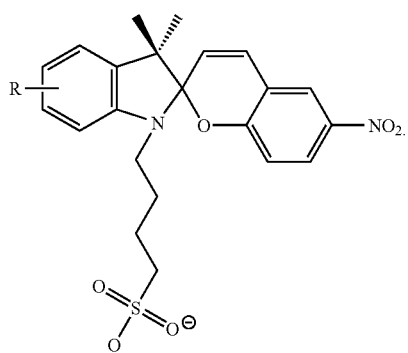

The photochromic materials are present in the marking particles in an amount of at least about 0.01 percent by weight of the marking particles. In embodiments the marking particles comprise spiropyran and dithienylethene materials as the photochromic materials in an amount of at least about 0.01 percent by weight of the marking particles. In other embodiments comprising a mixture of spiropyran and dithienylethene materials, the spiropyran and dithienylethene materials are present in an amount of at least about 0.05 percent by weight of the marking particles and the spiropyran material is present in an amount no more than about 5 percent by weight of the marking particles.

A further embodiment of the present disclosure is directed to a display composed of marking particles, with the marking particles comprising a resin, a chelating agent, and a mixture of photochromic materials within the particles. Another embodiment is directed to a display composed of marking particles made of a first polymer, a second polymer, a chelating agent, and a mixture or plurality of photochromic materials within the particles.

The chelating agent may be a metal salt in the +2 state. Suitable chelating agents include, but are not limited to, calcium, magnesium, zinc and transition metals. The chelating agent may be present in the marking particles in an amount relative to the spiropyran material of at least about 1 mole of chelating agent for every mole of spiropyran material. In embodiments, the chelating agent is present in about at least 2 moles of chelating agent for every mole of spiropyran material. In other embodiments, the chelating agent is present in the marking particles, in an amount relative to the spiropyran material of no more than about 10 moles of chelating agent for every one mole of spiropyran material.

In embodiments, the spiropyran material may be incorporated into the back bone of either the first or second polymer. Suitable as the first polymer is a resin polymer of monomers styrene, α-methylstyrene, vinyl toluene, n-alkyl methacrylates, n-alkyl acrylates, branched alkyl methacrylates, branched alkyl acrylates, chlorinated olefins, vinyl-phenolic materials, alkoxy alkoxy alkyl acrylates, alkoxy alkoxy alkyl methacrylates, cyano alkyl acrylates, cyano alkyl methacrylates, alkoxy alkyl acrylates, alkoxy alkyl methacrylates, methyl vinyl ether, maleic anhydride, butadiene, ethylene, vinylacetate, isobutylene, isoprene, or mixtures thereof.

The second polymer may generally be prepared by interfacial polymerization of (a) an organic soluble shell monomer and (b) an aqueous soluble monomer. Monomers suitable as the organic soluble shell monomer include sebacoyl chloride, terephthaloyl chloride, phthaloyl chloride, isophthaloyl chloride, azeloyl chloride, glutaryl chloride, adipoyl chloride, hexamethylene diisocyanate, 4,4'-dicyclohexylmethane diisocyanate, 2,4-toluene diisocyanate, 2,6-toluene diisocyanate, trans-1,4-cyclohexane diisocyanate, 4,4'-methyidiphenyl diisocyanate, 1,3,5-benzenetricarboxylic acid chloride, 4,4'-methyidiphenyl diisocyanate, tris(isocyanatophenyl) thiophosphate, or mixtures thereof. Monomers suitable as the aqueous soluble monomer include 1,6-hexanediamine, 1,4-bis(3-aminopropyl)piperazine, 2-methylpiperazine, m-xylene-α,α'-diamine, 1,8-diamino-p-menthane, 3,3'-diamino-N-methyldipropylamine, 1,3-cyclohexanebis(methylamine), 1,4-diaminocyclohexane, 2-methylpentanediamine, 1,2-diaminocyclohexane, 1,3-diaminopropane, 1,4-diaminobutane, 2,5-dimethylpiperazine, piperazine, fluorine-containing 1,2-diaminobenzenes, N,N'-dimethylethylenediamine, diethylenetriamine, bis(3-aminopropyl)amine, tris(2-aminoethyl)amine, or mixtures thereof. In embodiments, the second polymer is selected from polyureas, polyurethanes, polyesters, thermotropic liquid crystalline polyesters, polycarbonates, polyamides, polysulfones, poly(urea-urethanes), poly(ester-amides), poly(urea-amides), or mixtures thereof.

In embodiments, the first polymer is present in an amount of from about 35 to about 90 percent by weight of the marking particles and the second polymer is present in an amount of from about 5 to about 50 percent by weight of the marking particles.

The marking particles may also include other components as is known in the art. For example, the marking particles may optionally contain charge control additives, such as alkyl pyridinium halides, bisulfates, the charge control additives disclosed in U.S. Pat. No. 3,944,493, U.S. Pat. No. 4,007,293, U.S. Pat. No. 4,079,014, U.S. Pat. No. 4,394,430, and U.S. Pat. No. 4,560,635, the disclosures of each of which are totally incorporated herein by reference, and the like, as well as mixtures thereof. Charge control additives are present in the marking particles in any desired or effective amounts, typically at least about 0.1 percent by weight of the marking particles, and typically no more than about 5 percent by weight of the marking particles, although the amount can be outside of this range.

Optionally, the marking particles of the present disclosure can also include a colorant in addition to the mixture of photochromic materials. Typically, the colorant material is a pigment, although dyes can also be employed. Examples of suitable pigments and dyes are disclosed in, for example, U.S. Pat. No. 4,788,123, U.S. Pat. No. 4,828,956, U.S. Pat. No. 4,894,308, U.S. Pat. No. 4,948,686, U.S. Pat. No. 4,963,455, and U.S. Pat. No. 4,965,158, the disclosures of each of which are totally incorporated herein by reference. Specific examples of suitable dyes and pigments include carbon black, nigrosine dye, aniline blue, magnetites, and the like, as well as mixtures thereof. Colored pigments are also suitable for use with the present disclosure, including red, green, brown, magenta, cyan, and yellow particles, as well as mixtures thereof, wherein the colored pigments are present in amounts that enable the desired color. Illustrative examples of suitable magenta pigments include 2,9-dimethyl-substituted quinacridone and anthraquinone dye, identified in the color index as C1 60710, C1 Dispersed Red 15, a diazo dye identified in the color index as C1 26050, C1 Solvent Red 19, and the like. Illustrative examples of suitable cyan pigments include copper tetra-4-(octadecylsulfonamido) phthalocyanine, copper phthalocyanine pigment, listed in the color index as C1 74160, Pigment Blue, and Anthradanthrene Blue, identified in the color index as C1 69810, Special Blue X-2137, and the like. Illustrative examples of yellow pigments that may be selected include diarylide yellow 3,3-dichlorobenzidine acetoacetanilides, a monoazo pigment identified in the color index as C1 12700, C1 Solvent Yellow 16, a nitrophenyl amine sulfonamide identified in the color index as Foron Yellow SE/GLN, C1 Dispersed Yellow 33, 2,5-dimethoxy acetoacetanilide, Permanent Yellow FGL, and the like. Other suitable colorants include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G0 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich, Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3871 K (BASF), Paliogen Red 3340 (BASF), and Lithol Fast Scarlet L4300 (BASF).

The colorants are typically present in the marking particles in an amount of from about 2 to about 20 percent by weight, although the amount can be outside this range. Furthermore, in certain instances, the addition of colorants to marking particles is unsuitable for photochromic displays such as where one of the desired states is invisible.

Images printed with the marking particles of the present disclosure are photochromic in that they have a first state corresponding to a first absorption spectrum and a second state corresponding to a second absorption spectrum. Moreover, there is a mixture of photochromic materials within the particles, each photochromic material being sensitive to different wavelengths of light, allowing multiple colored images to be generated. In all instances, the photochromic materials may be returned to their original "invisible" state by subjecting the particle to the appropriate wavelength of light.

The marking particles comprising a mixture of photochromic materials may also be used as toner particles and may be used in single component or two component development processes. When used in a two component development process, the developer includes a toner comprising marking particle that includes a mixture of photochromic materials, and carrier particles.

In another embodiment, a process for forming a multicolored image is disclosed herein. The process includes (a) generating an electrostatic latent image on an imaging member; (b) developing the latent image by contacting the imaging member with marking particles, wherein the marking particles comprise a mixture of photochromic material, each photochromic material being sensitive to different wavelengths of light and exhibiting a different color relative to the other when undergoing a photochromic change; and (c) thereafter effecting a photochromic change in at least one of the photochromic materials. The process may also include erasing the visible colored image, or a portion thereof, by returning one or both of the photochromic materials to its first "invisible" state.

Another embodiment of the disclosure is directed to a process which comprises (a) generating an electrostatic latent image on an imaging member; (b) developing the latent image by contacting the imaging member with marking particles according to the disclosure and containing a mixture of photochromic materials each having a first state corresponding to a first absorption spectrum and a second state corresponding to a second absorption spectrum wherein the second state of the photochromic materials are visible states; and (c) thereafter effecting a photochromic change in at least some of the photochromic material in the developed image from the first state to the second state. In embodiments, the visible state or states of a photochromic material is a different color relative to the other photochromic material(s).

In a further embodiment, a method of embedding and recovering machine readable information on a substrate is disclosed herein. The method comprises (a) writing data in a predetermined machine readable code format on the substrate with photochromic marking particles according to the present disclosure having a first state corresponding to a first absorption spectrum and a second state corresponding to a second absorption spectrum, and (b) thereafter effecting a photochromic change in at least some of the photochromic marking particles from the first state to the second state, wherein a first portion of the photochromic marking particles is caused to shift from the first state to the second state and a second portion of the photochromic marking particles remains in the first state.

In one of the above embodiments, the photochromic marking particles in the second state subsequently are caused to undergo another photochromic change, thereby returning them to the first state. In another of these embodiments, the machine readable code format comprises a set of distinguishable symbols including a first symbol for encoding 0s and a second symbol for encoding 1s, wherein the symbols are written on a substantially constant center-to-center spacing. In yet another of these embodiments, the machine readable code format comprises a set of glyphs wherein each glyph corresponds to a digital value of bit length n and wherein the set comprises $2^n$ distinctive shapes. In still another of these embodiments, the glyphs are elongated along axes that are tilted at angles of plus and minus about 45° with respect to a horizontal axis to discriminate at least some of said digital values from each other.

The photochromic shift of a photochromic particle from the first state to the second state can be effected by any method suitable for the photochromic material. Examples of methods for inducing the photochromic shift include irradiation with radiation of a suitable wavelength, typically from about 190 to about 425 nanometers, although the wavelength can be outside this range. The reverse photochromic effect can be induced by irradiation with visible light, typically in the wavelength range of from about 425 to about 700 nanometers, although the wavelength can be outside this range, or by the application of heat. By irradiating the particles with various wavelengths of light, the individual photochromic elements, each with their own unique wavelength sensitivities, are selectively turned on or off. This can result in additive color effects.

The marking particles disclosed herein can be used to print unnoticeable images such as logos, text, watermarks, or other markers on substrates such as paper or the like. For example, an image may be printed with a composition comprising marking particles that include a mixture of photochromic materials, such as spiropyrans of the formula

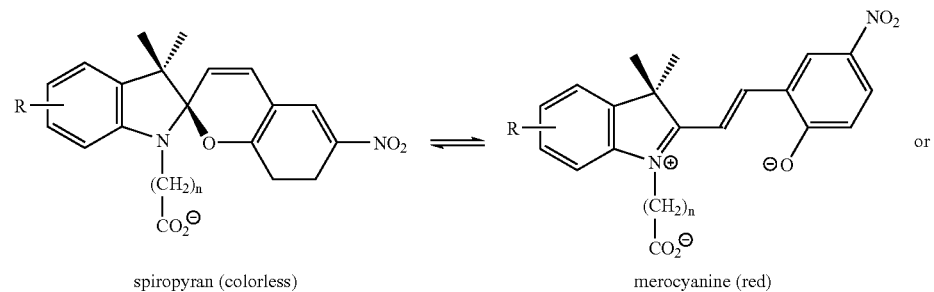

spiropyran (colorless) ⇌ merocyanine (red)    or

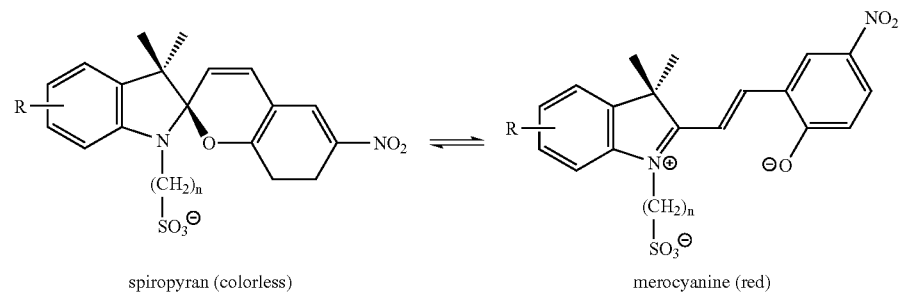

spiropyran (colorless) ⇌ merocyanine (red)

where n is an integer representing the number of repeat —CH$_2$— units, and R is —H or —CH=CH$_2$; and a dithienyl of the formula

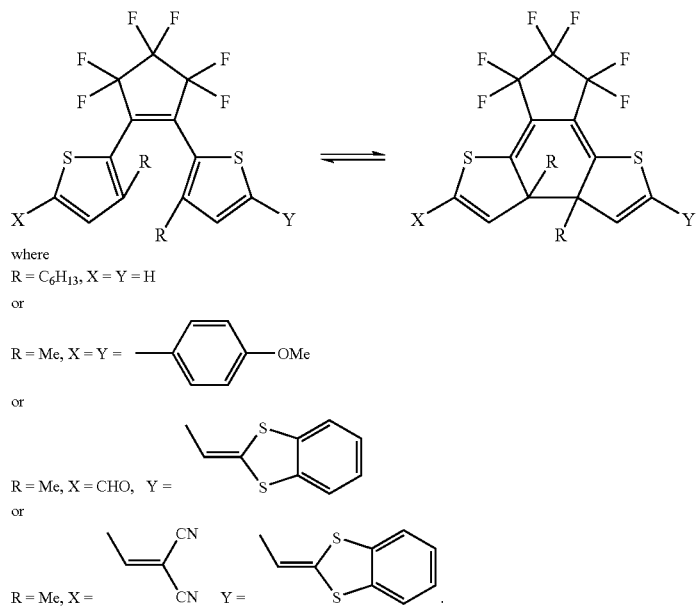

where
R = C$_6$H$_{13}$, X = Y = H
or
R = Me, X = Y = —⟨phenyl⟩—OMe
or
R = Me, X = CHO, Y = ⟨benzodithiole group⟩
or
R = Me, X = ⟨CH=C(CN)$_2$⟩, Y = ⟨benzodithiole group⟩.

When the imaged substrate is exposed to light at from about 190 to about 425 nanometers the spiropyran immediately undergoes a ring-opening to a strongly fluorescent red colored merocyanine form. In a further embodiment, the marking particles can be used to print an unnoticeable or unobtrusive mark superimposed with another clearly visible image such as a logo or text; the mark does not impair the readability of the logo or text image when the material is in the spiropyran form. Alternatively, when the imaged substrate is exposed to light of 250, 315, 365 and 410 nm wavelengths the dithienylethenes undergo a ring closure to yield pink, deep blue, deep green or yellow, depending on the substituents on the dithienylethene. Upon attempting to copy or scan the superimposed images, however, the light radiation from the copier or scanner converts the mark in the spiropyran form to the merocyanine form. The marks in the merocyanine form then appear as solid patches, thus rendering the superimposed logo or text image uncopyable. A similar reversion to the colorless form occurs with the dithienylethene molecules.

The marking particles can also be used to print embedded data. For example, by introducing into a color xerographic imaging machine containing the typical four toner cartridges of cyan, magenta, yellow, and black, a fifth cartridge containing, for example, a second yellow toner that also contains the spiropyran or dithienylethene, special marks, such as bar codes (bar-like codes and methods and apparatus for coding and decoding information contained therein are disclosed in, for example, U.S. Pat. No. 4,692,603, U.S. Pat. No. 4,665,004, U.S. Pat. No. 4,728,984, U.S. Pat. No. 4,728,783, U.S. Pat. No. 4,754,127, and U.S. Pat. No. 4,782,221, the disclosures of each of which are totally incorporated herein by reference) or "glyphs" as disclosed in, for example, U.S. Pat. No. 5,710,420, U.S. Pat. No. 5,128,525, U.S. Pat. No. 5,291,243, U.S. Pat. No. 5,168,147, U.S. Pat. No. 5,091,966, U.S. Pat. No. 5,051,779, U.S. Pat. No. 5,337,361, European Patent Application 469,864-A2, and European Patent Application 459,792-A2, the disclosures of each of which are totally incorporated herein by reference, can be introduced unnoticed into graphics, text, or other images to embed extra or coded information that becomes detectable either by a special scanner that interprets the information and translates it into human readable terms, or with ultraviolet light.

The marking particles of the present disclosure can also be used to generate electronically addressable displays. For example, the marking particles may be applied uniformly to a substrate such as paper and fused or otherwise permanently affixed thereto. The substrate has a blank appearance. For example, in the embodiments utilizing a mixture of a spiropyran and the dithienylethenes, an addressing wand may be used to irradiate certain areas of the substrate with radiation, such as UV light, converting the irradiated areas from the colorless spiropyran form to the red merocyanine form or the colorless dithienylethene to the colored ring-closed product, thereby causing the irradiated areas to appear colored. For erasure of the markings, the entire substrate is irradiated with light of the appropriate wavelength for conversion of the red merocyanine form or the colored dithienylethene back to the colorless form. This embodiment constitutes a reflective, reimageable display.

In another embodiment, the spiropyran is photochromically unstable over extended periods of time. Addressing of the substrate allows markings to remain visible only temporarily (for example, hours or days). Such temporary markings are useful in the protection of confidential information and in the area of secure documents.

The marking particles disclosed herein can be applied to any desired substrate. Examples of suitable substrates include (but are not limited to) plain papers such as Xerox® 4024 papers, ruled notebook paper, bond paper, silica coated papers such as Sharp Company silica coated paper, Jujo paper, and the like, transparency materials, fabrics, textile products, plastics, polymeric films, inorganic substrates such as metals and wood, and the like.

The marking particles provide a number of advantages. The marking particles with the mixture of photochromic materials allow for multiple viewing of several colored markings at once. This lends itself to sequential viewing of the document. For example, a first area of the document could be exposed to a first wavelength thereby causing a photochromic material to undergo a photochromic shift and reentering a certain mark visible in a particular color. Subsequently, different markings in different areas may be sequentially provided by exposing the different areas to a wavelength that will cause the photochromic material to undergo a photochromic shift. The use of marking particles having a mixture of photochromic materials that have photochromic shifts that produce different colors also allows for the creation of multicolored displays. Additionally, the use of marking particles having a mixture of photochromic materials may provide a document that is capable of showing different messages at once in a single space depending on the wavelength of light used to irradiate the area.

Specific embodiments of the disclosure will now be described in detail. These examples are intended to be illustrative, and the disclosure is not limited to the materials, conditions, or process parameters set forth in these embodiments. All parts and percentages are by weight unless otherwise indicated.

EXAMPLE I

A mixture of marking particles described in Example V of U.S. Pat. No. 6,652,959 B2 and similar particles containing dithienylethenes of the type

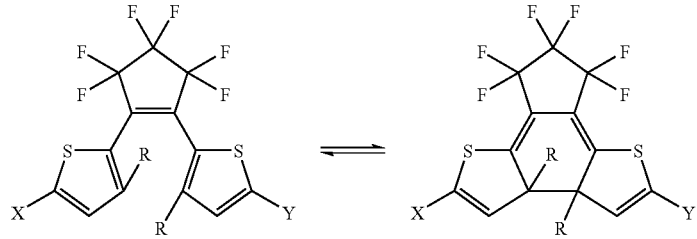

where
R = $C_6H_{13}$, X = Y = H
or

R = Me, X = Y = 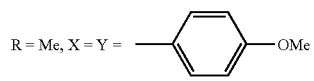

or

R = Me, X = CHO, Y = 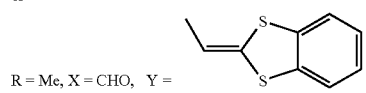

or

R = Me, X = 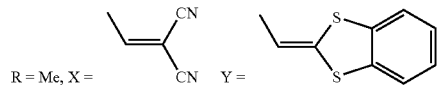

are combined and a developer composition is prepared as follows. 3 grams of marking particles (described in Example V of U.S. Pat. No. 6,652,959 B2, but with no pigment added) with 97 grams of carrier particles (also described in Example V of U.S. Pat. No. 6,652,959). The developer is then incorporated into an electrophotographic imaging device, followed by forming latent images, developing the latent images with the developer, transferring the developed images to substrates such as paper or transparency material, and fusing the developed images by application of heat, thereby forming colorless images on the substrates. The paper or transparency then contains marking particles with a mixture of photochromic materials, each sensitive to different wavelengths of light.

EXAMPLE II

The developed substantially colorless images formed in Example I are exposed to actinic radiation of various wavelengths in selected areas of the paper or transparency to create different colors. One area of the document is exposed to actinic radiation of wavelength 540 nanometers, thereby causing that area to become pink in color. Another location on the document is exposed to actinic radiation of wavelength 595 nanometers, thereby causing that area to become deep blue in color. A third area on the document is exposed to actinic radiation of wavelength 702 nanometers, thereby causing that area to become deep green in color. The overall result is a multicolored photochromic display consisting of pink, deep blue, and deep green areas. Subsequently, the colored images are all exposed to actinic radiation at wavelengths of 630 nanometers, thereby causing the images to return to a substantially colorless appearance.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A multicolored display comprising a substrate having uniformly situated thereon a coating of marking particles comprising a mixture of two photochromic materials, the two photochromic materials being a spiropyran material and a single dithienylethene, wherein sensitive different wavelengths of light and produce different colors from each other when each is exposed to the wavelength to which it is sensitive;

wherein the spiropyran material is of the formula

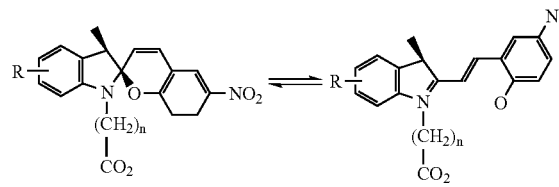

or

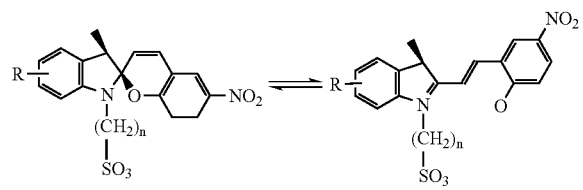

where n is an integer from 2 to 8, and R is —H or —CH=CH$_2$; and the dithienylethene is of the formula:

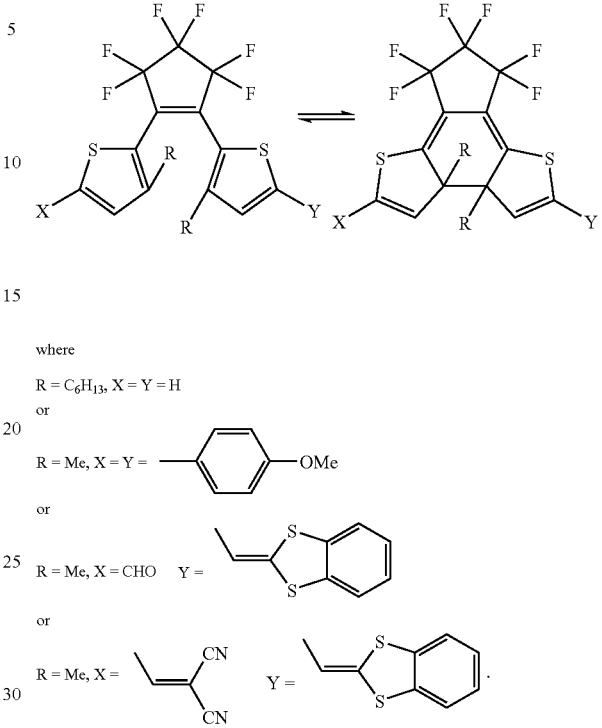

where

R = C$_6$H$_{13}$, X = Y = H or

R = Me, X = Y = —⟨C$_6$H$_4$⟩—OMe or

R = Me, X = CHO    Y = benzodithiole or

R = Me, X = CH=C(CN)$_2$    Y = benzodithiole.

2. The multicolored display of claim 1, wherein the spiropyran material is of the formula:

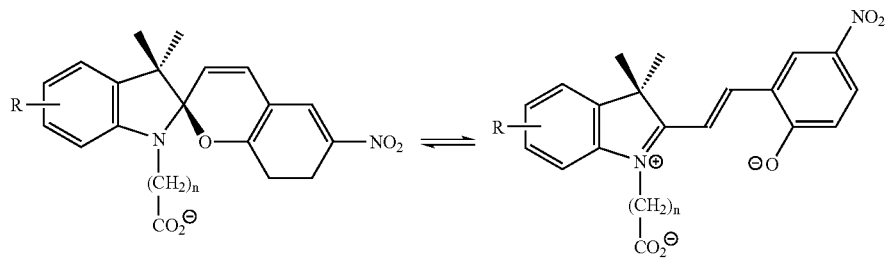

3. The multicolored display of claim 1, wherein the spiropyran material is of the formula:

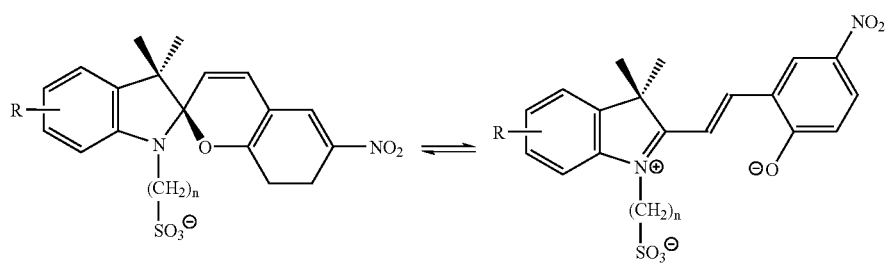

4. The multicolored display of claim 1, wherein the spiropyran material is of the formula:

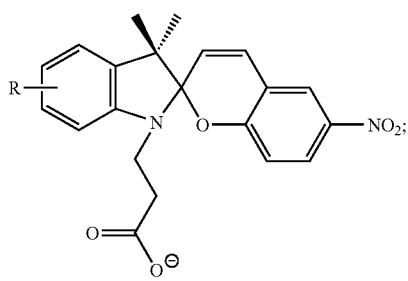

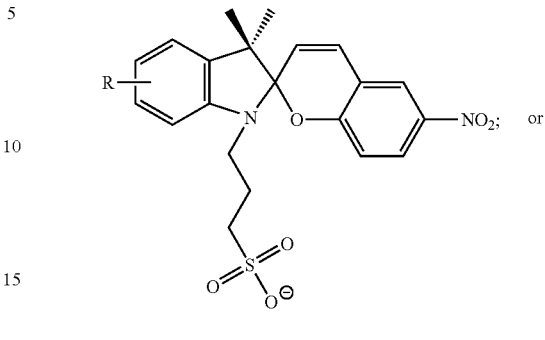

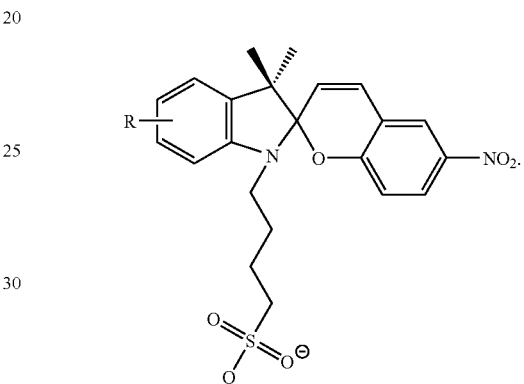

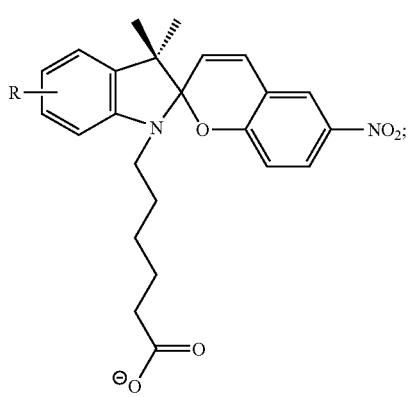

5. The multicolored display of claim 1, wherein the spiropyran material and the single dithienylethene are present in the marking particles in an amount of at least about 0.01 percent by weight of the marking particles.

6. The multicolored display of claim 1, wherein the spiropyran material and the single dithienylethene are present in the marking particles in an amount of at least about 0.05 percent by weight of the marking particles, and the spiropyran material is present in the marking particles in an amount of no more than about 5 percent by weight of the marking particles.

7. The multicolored display of claim 1, wherein the marking particles further comprise a resin and a chelating agent.

8. The multicolored display of claim 1, wherein the marking particles further comprise a first polymer, a second polymer, and a chelating agent.

9. The multicolored display of claim 1, wherein the multicolored display is an addressable display.

10. The multicolored display of claim 1, wherein at least one of the photochromic materials exhibits at least two photochromic states, the at least two photochromic states having a different absorption spectrum relative to each other and producing a different color relative to each other.

11. The multicolored display of claim 10, wherein the photochromic material with the multiple photochromic states produces different colors relative to the other photochromic material.

12. A multicolored display comprising a substrate having uniformly situated thereon a coating of marking particles, said marking particles comprising a first polymer, a second polymer, a chelating agent, and two photochromic materials, the two photochromic materials being a spiropyran material of the formula

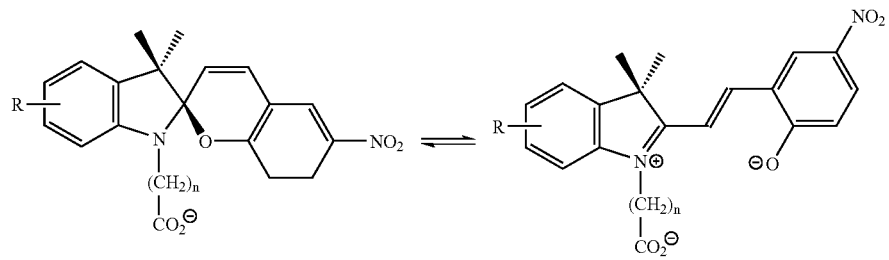
or
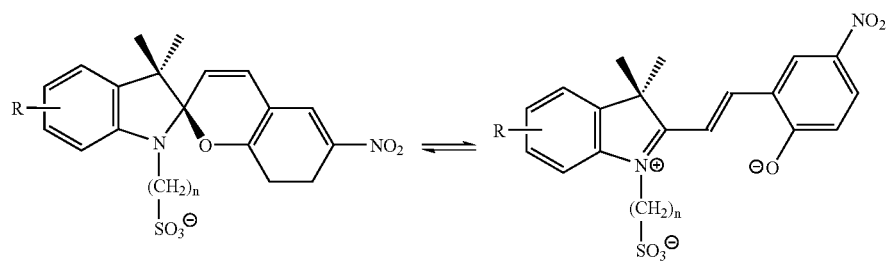
wherein R is an integer representing the number of repeat —CH$_2$— units, and R is —H or —CH=CH$_2$; and a single dithienylethene of the formula:
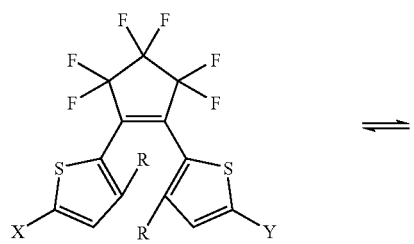
-continued
where
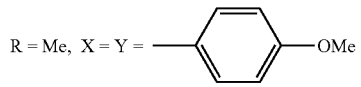
or
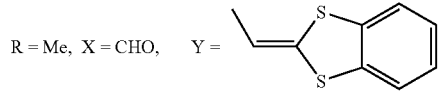
or
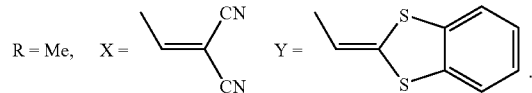
13. The multicolored display of claim 12, wherein the spiropyran material is of the formula:
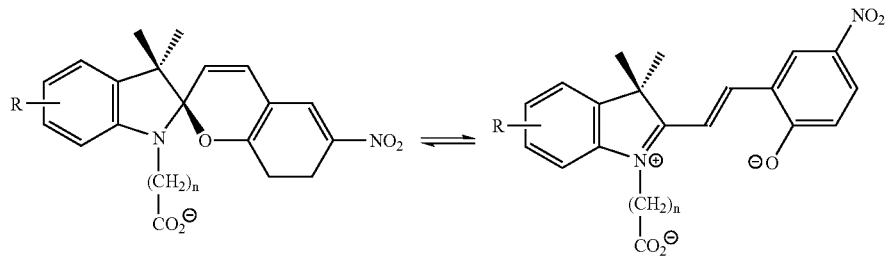

wherein n is an integer of from about 2 to about 8.

14. The multicolored display of claim 12, wherein the spiropyran material is of the formula:

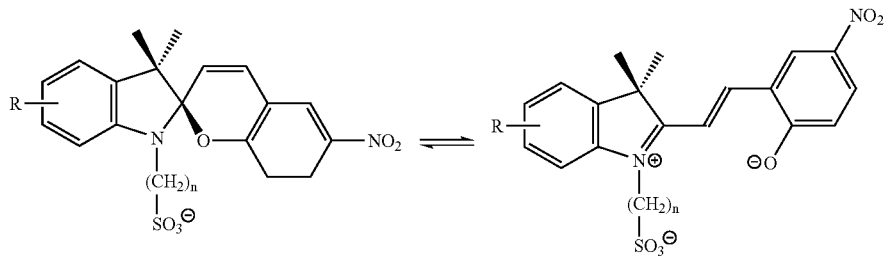

wherein n is an integer of from about 2to about 8.

15. The multicolored display of claim 12, wherein the spiropyran material is of the formula:

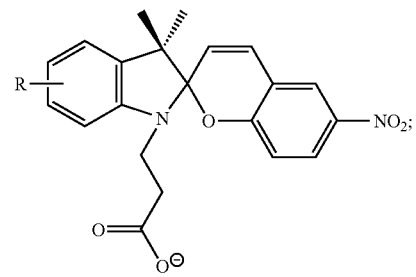

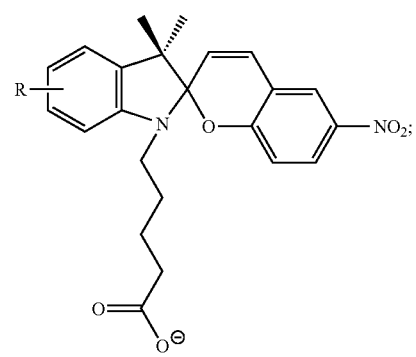

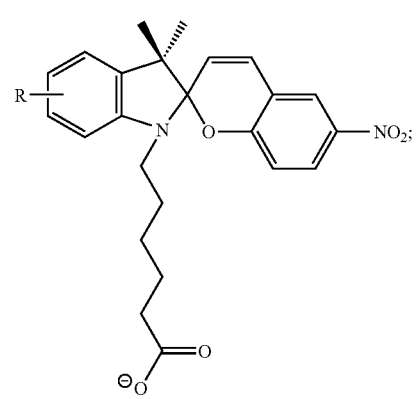

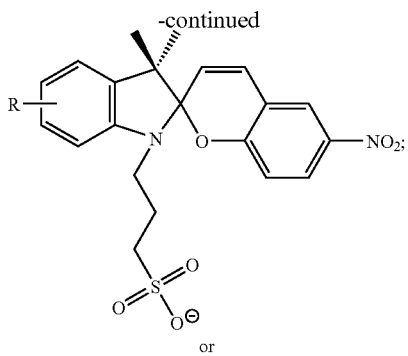

or

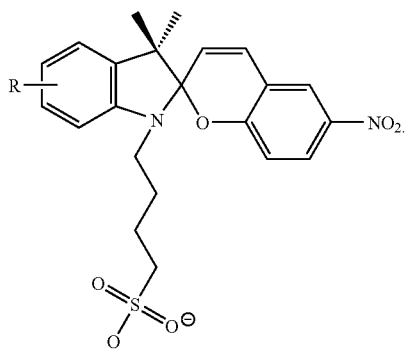

16. The multicolored display of claim 12, wherein the spiropyran material and the single dithienylethene are present in the marking particles in an amount of at least about 0.01 percent by weight of the marking particles.

17. The multicolored display of claim 12, wherein the spiropyran material and the single dithienylethene are present in the marking particles in an amount of at least about 0.05 percent by weight of the marking particles, and wherein the spiropyran material is present in the marking particles in an amount of no more than about 5 percent by weight of the marking particles.

18. The multicolored display of claim 12, wherein the chelating agent is a metal salt in the +2 state.

19. The multicolored display of claim 12, wherein the chelating agent is a salt of calcium, magnesium, zinc, or a transition metal.

20. The multicolored display of claim 12, wherein the chelating agent is present in the marking particles in an amount relative to the spiropyran material of at least about 1 mole of chelating agent for every 1 mole of spiropyran material.

21. The multicolored display of claim 12, wherein the chelating agent is present in the marking particles in an amount relative to the spiropyran material of at least about 2 moles of chelating agent for every 1 mole of spiropyran material.

22. The multicolored display of claim 21, wherein the chelating agent is present in the marking particles in an amount relative to the spiropyran material of no more than about 10 moles of chelating agent for every 1 mole of spiropyran material.

23. The multicolored display of claim 12, wherein the spiropyran material is incorporated into the backbone of the first polymer or the second polymer.

24. The multicolored display of claim 12, wherein the first polymer is a polymer comprising monomers selected from styrene, α-methylstyrene, vinyl toluene, n-alkyl methacrylates, n-alkyl acrylates, branched alkyl methacrylates, branched alkyl acrylates, chlorinated olefins, vinyl-phenolic materials, alkoxy alkoxy alkyl acrylates, alkoxy alkoxy alkyl methacrylates, cyano alkyl acrylates, cyano alkyl methacrylates, alkoxy alkyl acrylates, alkoxy alkyl methacrylates, methyl vinyl ether, maleic anhydride, butadiene, ethylene, vinylacetate, isobutylene, isoprene, or mixtures thereof.

25. A multicolored display of claim 12, wherein the second polymer is prepared by interfacial polymerization of (a) an organic soluble shell monomer selected from the group consisting of sebacoyl chloride, terephthaloyl chloride, phthaloyl chloride, isophthaloyl chloride, azeloyl chloride, glutaryl chloride, adipoyl chloride, hexamethylene diisocyanate, 4,4'-dicyclohexylmethane diisocyanate, 2,4-toluene diisocyanate, 2,6-toluene diisocyanate, trans-1,4-cyclohexane diisocyanate, 4,4'-methyidiphenyl diisocyanate, 1,3,5-benzenetricarboxylic acid chloride, 4,4'-methyidiphenyl diisocyanate, tris (isocyanatophenyl) thiophosphate, or mixtures thereof, and (b) an aqueous soluble monomer selected from the group consisting of 1,6-hexanediamine, 1,4-bis(3-aminopropyl) piperazine, 2-methylpiperazine, m-xylene-α,α'-diamine, 1,8-diamino-ρ-menthane, 3,3'-diamino-N-methyldipropylamine, 1,3-cyclohexanebis(methylamine), 1,4-diaminocyclohexane, 2-methylpentanediamine, 1,2-diaminocyclohexane, 1,3-diaminopropane, 1,4-diaminobutane, 2,5-dimethylpiperazine, piperazine, fluorine-containing 1,2-diaminobenzenes, N,N'-dimethylethylenediamine, diethylenetriamine, bis(3-aminopropyl)amine, tris(2-aminoethyl)amine, or mixtures thereof.

26. The multicolored display of claim 12, wherein the second polymer is selected from the group consisting of polyureas, polyurethanes, polyesters, thermotropic liquid crystalline polyesters, polycarbonates, polyamides, polysulfones, poly(urea-urethanes), poly(ester-amides), poly(urea-amides), or mixtures thereof.

27. The multicolored display of claim 12, wherein the first polymer is present in an amount of from about 35 to about 90 percent of the marking particles and wherein the second polymer is present in an amount of from about 5 to about 50 percent by weight of the marking particles.

28. The multicolored display of claim 12, further comprising a charge control agent.

29. The multicolored display of claim 12, further comprising a colorant.

30. A multicolored display comprising marking particles according to claim 12, wherein the marking particles are present in an amount of at least about 1 percent by weight of the carrier particles, and wherein the marking particles are present in an amount of no more than about 5 percent by weight of the carrier particles.

\* \* \* \* \*